United States Patent
Shyam et al.

(10) Patent No.: US 6,591,334 B1
(45) Date of Patent: Jul. 8, 2003

(54) METHOD AND APPARATUS FOR REDUCING SPACE ALLOCATION FAILURES IN STORAGE MANAGEMENT SYSTEMS

(75) Inventors: Sanjay Shyam, Los Altos, CA (US); Victor Liang, San Jose, CA (US); Gary A. Pizl, San Jose, CA (US); Ray P. Swartz, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 154 days.

(21) Appl. No.: 09/596,869

(22) Filed: Jun. 19, 2000

Related U.S. Application Data

(62) Division of application No. 08/892,246, filed on Jul. 14, 1997, now Pat. No. 6,088,764.

(51) Int. Cl.$^7$ ............................................. G06F 12/00
(52) U.S. Cl. ..................... 711/112; 711/171; 711/172; 711/173; 711/4
(58) Field of Search ................................. 711/100, 112, 711/114, 170, 171, 174, 172, 4

(56) References Cited

U.S. PATENT DOCUMENTS

| | | | |
|---|---|---|---|
| 4,888,681 A | | 12/1989 | Barnes et al. ............... 364/200 |
| 5,134,563 A | * | 7/1992 | Tayler et al. ............... 711/143 |
| 5,193,171 A | | 3/1993 | Shinmura et al. ........... 395/425 |
| 5,235,690 A | | 8/1993 | Beardsley et al. .......... 711/113 |
| 5,247,638 A | * | 9/1993 | O'Brien et al. ............. 710/68 |
| 5,287,500 A | | 2/1994 | Stoppani, Jr. ............... 395/600 |
| 5,390,315 A | * | 2/1995 | Blandy et al. ............... 711/112 |
| 5,440,737 A | | 8/1995 | Uchinuma ................... 395/600 |
| 5,463,776 A | | 10/1995 | Voigt et al. ................. 395/600 |
| 5,546,557 A | | 8/1996 | Allen et al. ................. 711/111 |
| 5,561,786 A | | 10/1996 | Morse ......................... 711/170 |
| 5,579,516 A | | 11/1996 | Maren et al. ................ 707/1 |
| 5,713,008 A | * | 1/1998 | Falkner ....................... 711/170 |
| 5,802,599 A | | 9/1998 | Cabrera et al. ............. 711/170 |
| 5,875,459 A | | 2/1999 | Taoda .......................... 711/114 |
| 5,901,327 A | * | 5/1999 | Ofek ........................... 711/112 |
| 6,088,764 A | | 7/2000 | Shyam et al. ............... 711/112 |
| 6,122,646 A | * | 9/2000 | Igarashi et al. ............. 707/205 |

* cited by examiner

Primary Examiner—Matthew Kim
Assistant Examiner—Pierre-Michel Bataille
(74) Attorney, Agent, or Firm—Donald J. Pagel

(57) ABSTRACT

A method and apparatus for reducing space allocation failures in a computer system that utilizes direct access storage devices to store data. The method comprises the steps of determining if authorization has been given to attempt to allocate an initial space request over more than one volume, and, if so, attempting to allocate space on a plurality of volumes. If the initial space request cannot be allocated on a plurality of volumes, the initial space request is reduced by a preset percentage, the five-extent limit is removed and an attempt is made to allocate the reduced space request on the plurality of volumes with the five extent limit removed. Alternatively, if authorization has not been given to attempt to allocate the initial space request over more than one volume, the initial space request is reduced by a preset percentage, the five-extent limit is removed and an attempt is made to allocate the reduced space request on a single volume.

5 Claims, 3 Drawing Sheets

METHOD AND APPARATUS FOR REDUCING SPACE ALLOCATION FAILURES IN STORAGE MANAGEMENT SYSTEMS

This is a division of Ser. No. 08/892,246, filed Jul. 14, 1997, now U.S. Pat. No. 6,088,764, issued Jul. 11, 2000.

TECHNICAL FIELD

The present invention relates to data storage in direct access storage device systems and more particularly to a method for reducing errors that result when sufficient space on a storage volume cannot be allocated to a user of the system.

BACKGROUND ART

A problem frequently encountered by users of a computer system that utilizes a direct access storage device (DASD) occurs when space constraints prevent a data set from being initially allocated or extended on the storage device. This problem occurs because the user must estimate the maximum size of the data set to be stored on the direct access storage device system. If the system cannot allocate as much space as the user has requested, a space allocation error is returned to the user.

In many types of data set organizations, when a space allocation request is made, it must be allocated within a preset number of extents or sections. For example, a five extent limit means that a space request (e.g. one hundred cylinders) cannot span more than five extents or contiguous sections. This type of organizational constraint is a frequent cause of space allocation errors.

SUMMARY OF THE PRESENT INVENTION

The present invention comprises a method and apparatus for reducing space allocation failures. In the method of the present invention, when a message is generated that an initial space request for a first amount of space on a DASD cannot be allocated, a preset limit on the number of extents that can be used to provide the first amount of space is changed. The preset limit (e.g. a five extent limit) is replaced with a revised limit on the number of extents. that can be used to provide the first amount of space. The revised limit is always greater than the preset limit.

At the same time the revised limit is being generated, the initial space request is reduced by a preset percentage to yield a revised space request. A new attempt is then made to allocate space on the first volume of the direct access storage device using the revised limit on the number of extents and the revised space request. If more than one DASD volume is available for accommodating a space request, then a plurality of volumes can be checked to locate a single volume on which to allocate the revised space request using the revised limit on the number of extents.

In a second embodiment of the present invention, before trying to allocate the initial space request on a single volume, an attribute (the volume count attribute) is checked to determine if authorization has been given to attempt to allocate the initial space request on more than one volume. If such authorization has been given, a first part of the initial space request is allocated on a first volume of DASD. If the whole initial space request has not been satisfied on the first volume, then a second part of the initial space request is allocated on a second volume of DASD. Additional parts of the initial space request are allocated on additional volumes of DASD, as necessary, until the initial space request has been satisfied.

If the initial space request could not be allocated by spreading it over a plurality of volumes, then the first extent limit is replaced with a second extent limit and the initial space request is reduced by a preset amount to yield the revised space request. An attempt is then made to allocate the revised space request by spreading it over the plurality of volumes.

DETAILED DESCRIPTION OF THE PREFERRED EMBODIMENT

Figure 1:
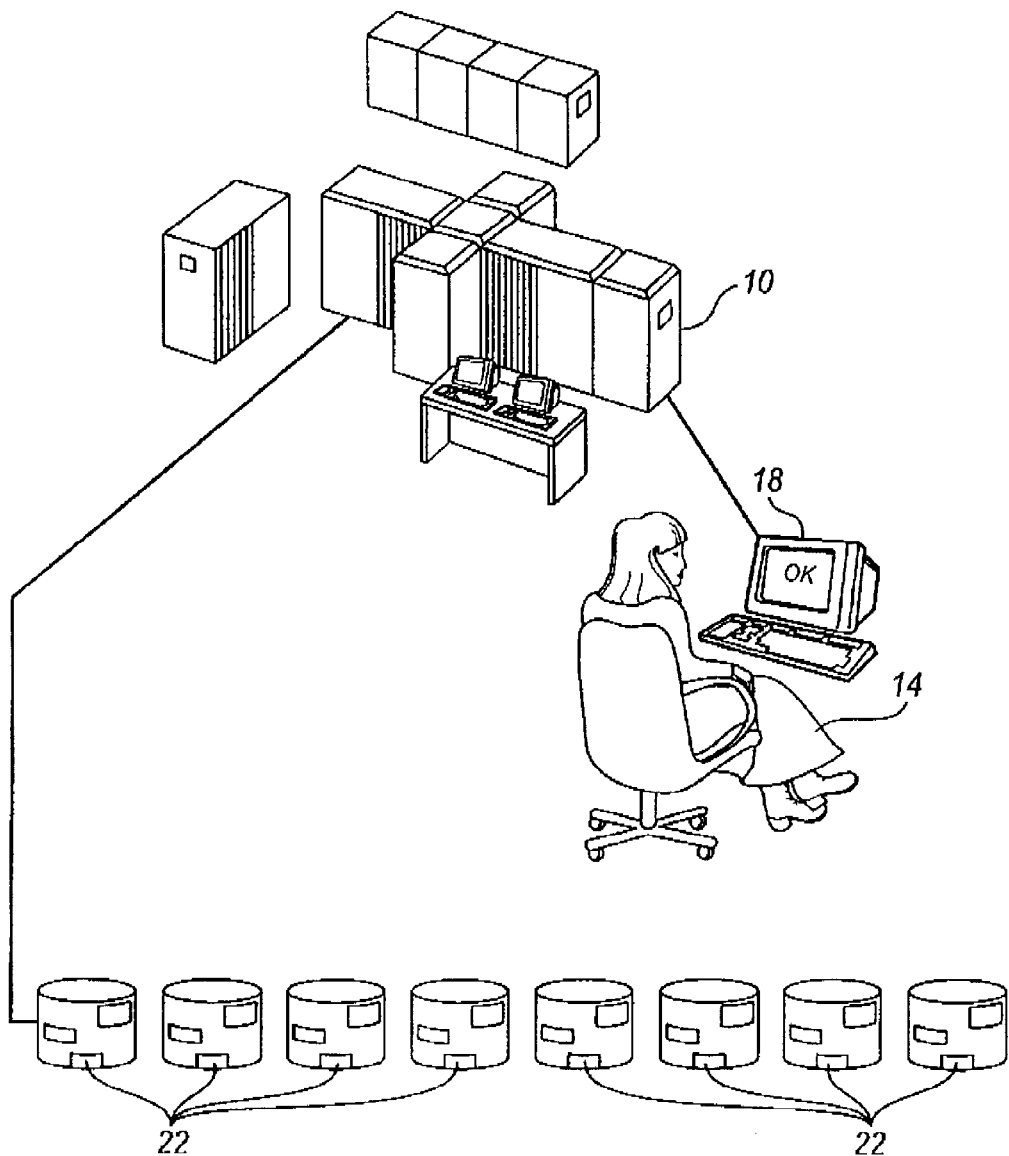
FIG. 1 is a schematic diagram of a computer system having means for reducing space allocation errors according to the present invention.

FIG. 1 illustrates a computer system 10 that is accessible by a user 14 using a workstation 18. The computer system 10 is connected to at least one direct access storage device 22 (DASD 22). For purposes of the present invention, each separate DASD 22 is referred to as a volume. In the preferred embodiment, a plurality of the DASD's 22 are connected to the computer 10. In the preferred embodiment, the computer system 10 is a mainframe computer like an IBM S/390 computer operating under IBM's Data Facility Storage Management Subsystem (DFSMS) environment. The DASD 22 is a hard magnetic disk file, such as an IBM D/T 3390. In other embodiments, other computer systems can be used as the computer system 10, other operating environments can be used and other types of direct access storage devices, such as optical disk files, can be used as the DASD 22.

In the present invention, when the user 14 requests that a new data set be allocated, the user 14 is given the option of directing the system to provide space constraint relief. This is done through the use of two attributes in the Data Class assigned to a data set. The first attribute allows the user 14 to indicate if space constraint relief is desired. The second attribute allows the user 14 to specify an amount by which the system will reduce the requested space quantity before retrying the allocation. In the preferred embodiment, the space reduction is specified as a percentage of the initial space request. Additionally, in the preferred embodiment, when the space reduction is requested, the system automatically removes the five-extent limit.

Figure 2:
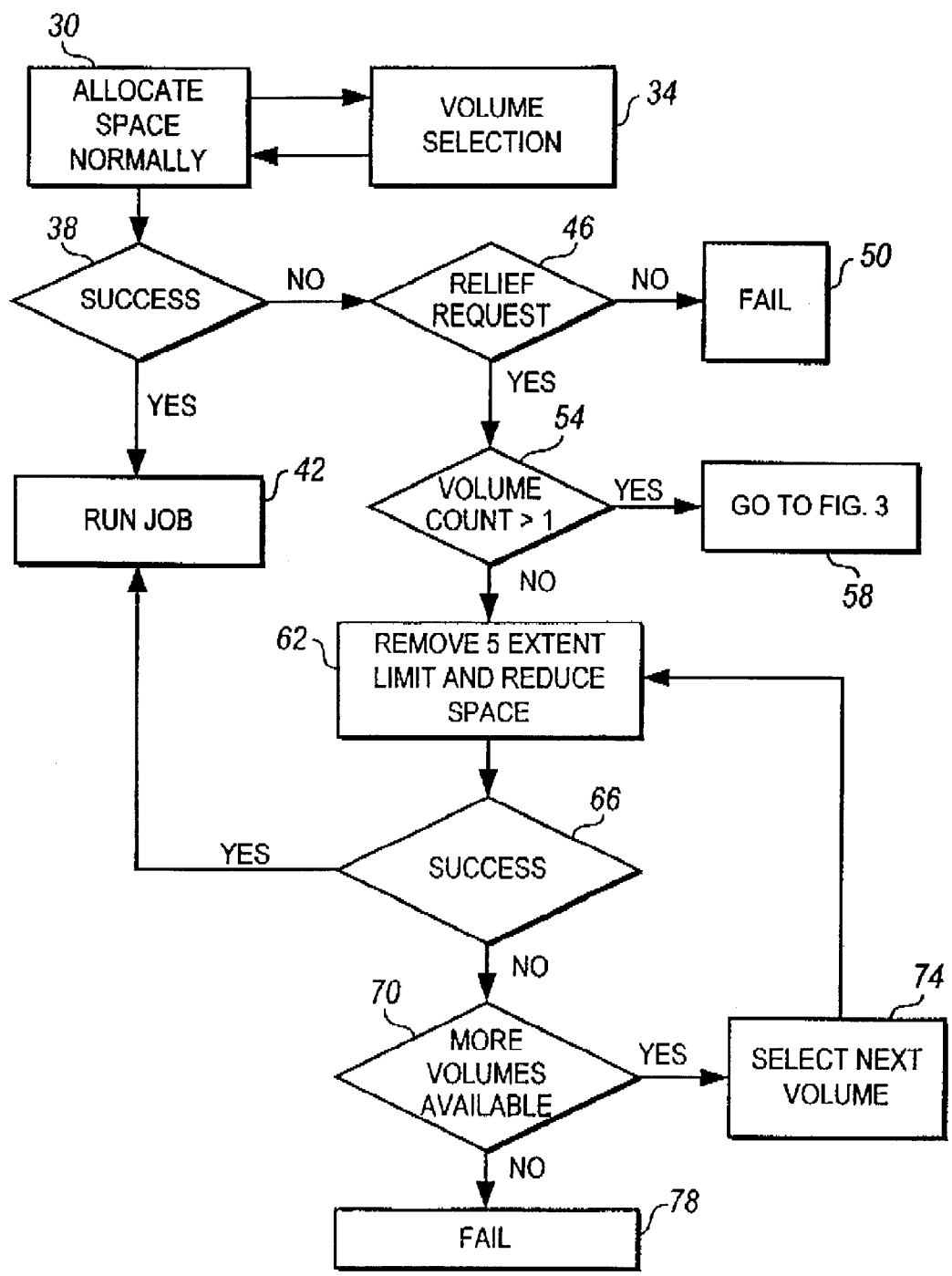
FIG. 2 is a flow chart of a method for reducing space allocation errors when a space request must be accommodated on a single volume according to the present invention.

FIG. 2 is a flowchart that illustrates one embodiment of the present invention. The embodiment shown in FIG. 2 is implemented by a computer program 28 running on the computer system 10. In block 30, the program 28 attempts to allocate the space requested by the user 14 according to a procedure employed in the prior art.

Block 34 indicates that a plurality of "N" volumes 22 in the system 10 can be evaluated to see if the user's space allocation request can be accommodated on a selected volume. Generally, a volume is evaluated for several factors before selection, such as space threshold, is the volume quiescent or enabled, etc. Block 38 indicates that if an acceptable volume has been identified that can accommodate the space request, the requested space is allocated to the user 14. Block 42 indicates that once space has been allocated to the user 14, the job (application) can begin running.

Block 46 indicates that if the space request cannot be satisfied on any of the N volumes in view of the five-extent limit, then the data class attributes are examined to determine if the user 14 has requested space allocation relief. If space allocation relief has not been requested, then block 50 returns a space allocation error message to the user 14, indicating that the space request could not be granted. It should be noted that block 46 is an optional feature of the present invention that gives the user 14 control over whether the space allocation relief algorithm is utilized or not. The invention would work equally well if the space allocation relief request is incorporated into the program as an automatic step when success at block 38 is not achieved.

Figure 3:
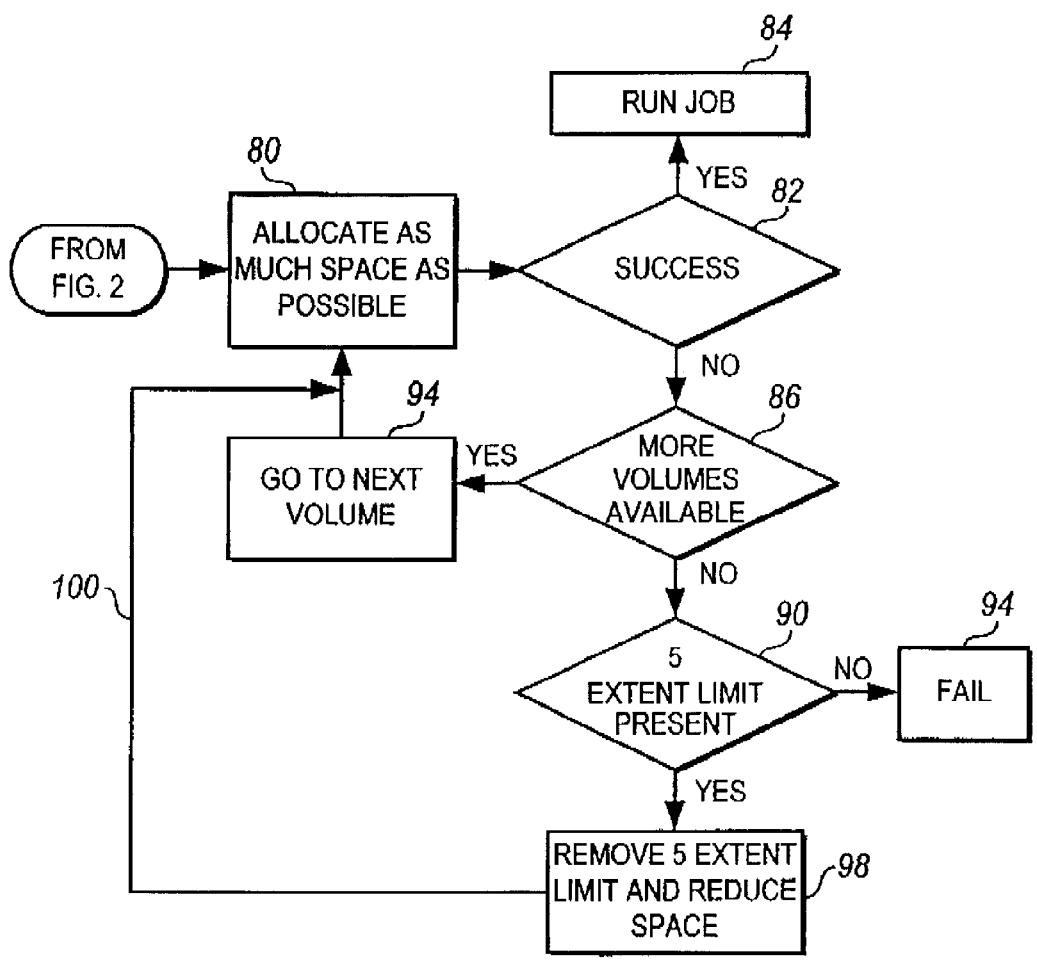
FIG. 3 is a flow chart of a method for reducing space allocation errors when a space request can be accommodated on a plurality of volumes according to the present invention.

Block 54 indicates that in the preferred embodiment of the present invention, a check is made to determine if more than one volume can be used to accommodate the space allocation request (i.e. the volume count is checked). If the answer is yes, then block 58 indicates that the algorithm shown in FIG. 3 is accessed. If the answer is no, meaning that the entire space request must be accommodated on a single volume, then block 62 is accessed. It should be appreciated that block 54 could be eliminated and block 62 could be accessed directly from blocks 38 or 46.

Block 62 indicates that a two-step process is utilized with respect to evaluating each individual volume that is available for accommodating the space request. First, the five extent limit is removed from the volume under evaluation. As was mentioned previously, the five extent limit could be some other preset limit on the number of extents that can be used to satisfy a space request, such as ten extents, twenty extents, etc. In the preferred embodiment, when the preset extent limit (e.g. the five extent limit) is removed, the space allocation request can be satisfied using as many extents as are available on the volume. Generally, the maximum number of extents that can be used is determined by the dataset organization. For example, in a sequential dataset, the maximum number of extents is sixteen. In a VSAM type data set, the maximum number of extents is one hundred and twenty-three per volume (VSAM is an acronym for virtual storage access method). However, in alternative embodiments, the preset extent limit could be replaced with a second preset extent limit that is less than the maximum number of extents allowable by the data set organization. For example, the five extent limit could be replaced by a twenty extent limit. Stated generally, in the present invention, a first extent limit (the five extent limit) is replaced with a second extent limit.

Second, block 62 also indicates that the initial space allocation request is reduced by a predetermined amount, thereby yielding a reduced space allocation request. In the preferred embodiment, the predetermined amount is expressed as a percentage of the initial space allocation request (e.g. 10%). The percentage is set by the user 14 by making an entry in the Data Class. In block 66, a determination is made as to whether or not the reduced space allocation request can be accommodated on the selected volume with the five extent limit removed. If the reduced space request can be allocated, then the job (application) is run as indicated by block 42.

If the determination made in block 66 shows that the selected volume cannot accommodate the reduced space request with the five extent limit removed, then block 70 is accessed. Block 70 indicates that a check is made to determine if additional volumes are available for possibly accommodating the reduced space request with the five extent limit removed. Generally, the additional volumes will be the same "N" volumes that were evaluated in block 34. If block 70 indicates that another volume is available, then in block 74 a new volume is selected. The new volume is processed by blocks 62, 66 and 70 in the same manner as the first volume was processed. This process is repeated until an acceptable volume has been identified in block 66 or until all "N" volumes have been evaluated under the reduced space request with the five extent limit removed.

If the determination is made in block 70 that none of the N volumes can accommodate the reduced space request with the five extent limit removed, then block 78 indicates that a space allocation failure is returned to the user 14.

The steps involved in the method of the preferred embodiment where the five extent limit and the initial space request reduction are performed at the same time can be summarized as follows:

EXAMPLE 1

1. In response to an indication that an initial space request for a first amount of space cannot be allocated, replacing a first extent limit on the number of extents that can be used to provide a space request with a second extent limit on the number of extents that can be used to provide the space request;
2. Reducing an initial space request by a preset amount to yield a revised space request;
3. Attempting to allocate space on a first volume of a plurality of volumes of direct access data storage using the second extent limit and the revised space request; and
4. If the revised space request cannot be allocated on the first volume, attempting to allocate the revised space request on each of the plurality of volumes until the revised space request is allocated on a single volume or until a determination is made that the revised space request cannot be allocated on a single volume of the plurality of volumes.

In the preferred embodiment described above, the step of removing the first or preset extent limit and the step of reducing the initial space allocation request by the predetermined amount are performed at the same time. In alternative embodiments, these two steps are separated. For example, the five extent limit (i.e. the preset or first extent limit) can be removed and the initial space request can be evaluated in view of the new (second) extent limit (i.e. step two could be eliminated). Alternatively, the initial space request can be reduced by the predetermined amount and evaluated in view of the five extent limit (i.e. step one could be eliminated or deferred). If the reduced space request cannot be accommodated in the five extent limit, then the five extent limit can be removed in a subsequent step.

It should also be noted that in alternative embodiments all of the "N" volumes can be evaluated before an acceptable volume is selected. This procedure allows a best volume to be selected instead of merely an acceptable volume. For example, in block 66, instead of proceeding to block 42 when an acceptable volume is identified, the address of the acceptable volume can be stored and some or all of the remaining "N" volumes can be evaluated with the address of each acceptable volume being stored. Then, all of the acceptable volumes can be evaluated according to some predetermined criteria before one of the acceptable volumes is selected for accommodating the reduced space request.

Referring now to FIG. 3, another embodiment of the present invention is illustrated. As mentioned previously, the user 14 has the option of specifying if it is acceptable to have the data spread over more than one volume. If block 54 (FIG. 2) indicates that the data can be spread over more than one volume, then block 80 is accessed instead of going to block 62. When block 80 is accessed, as much data as possible is allocated on the first volume within the five extent limit. In other words, block 80 determines the largest amount of the initial space request that can be allocated on the first volume within the five-extent limit.

Block 82 indicates that the space allocated on the first volume is compared to the total amount of space requested by the user 14 to determine if all of the requested space has been allocated to the user 14. With respect to the first time block 82 is accessed, all of the requested space will not have been allocated, because this would have resulted in success at block 38. On subsequent loops through block 82, all of the requested space may have been allocated. In that case, block 84 indicates that the job (application) can be run because the requested amount of space has been successfully allocated.

When all of the initial space request has not been allocated, block 86 indicates that a determination is made if additional volumes are available for possibly allocating the remainder of the requested space to the user 14. Again, with respect to the first time block 86 is accessed, there must be a second volume available or else block 54 would have yielded a "no" decision. On subsequent loops, there may not be additional volumes available. When no additional volumes are available, block 86 will yield a "no" decision and block 90 will be accessed.

When block 86 indicates that additional volumes are available, a second volume is selected as indicated by block 94. When the second volume is selected, block 80 indicates that as much of the remaining space as is possible is allocated on the second volume within the five extent limit. Block 82 then compares the total amount of space allocated on the first and second volumes to the total amount of space requested by the user 14 to determine if all of the requested space has been allocated to the user 14. If all of the requested space has been allocated, then the job (application) can be run as indicated by block 84.

If block 82 shows that all of the requested space has not been allocated, then block 86 is utilized to determine if a third volume is available for satisfying some or all of the remainder of the space request. If a third volume is selected (block 94), as much of the remaining space as is possible is allocated on the third volume within the five extent limit (block 80). The entire loop of blocks 82, 86, 94 and 80 is repeated until the entire space request is allocated (block 84) or until no more volumes are available, in which case block 90 is accessed.

Block 90 indicates that if the initial space request could not be spread over the "N" volumes, then a check is made to determine if the five extent limit (preset extent limit) is in place. If the five extent limit (preset extent limit) has already been removed, then block 94 returns a failure. If the five extent limit (preset extent limit) is present, then block 98 indicates that the five extent limit (preset extent limit) is removed and the initial space request is reduced by the predetermined amount in the same manner as was described previously with respect to block 62 (FIG. 2).

The line 100 indicates that after the five extent limit is removed and the initial space request is reduced by the predetermined amount, the entire loop of blocks 82, 86, 94 and 80 is repeated until the entire space request is allocated (block 84) or until no more volumes are available, in which case block 90 is accessed. However, after block 98 has been accessed, space is allocated on the volume or volumes without regard to the five extent limit. In other words, after block 98 is accessed, the algorithm attempts to allocate the reduced space request on one or more of the "N" volumes with the five extent limit removed.

The entire process can be summarized as follows:

EXAMPLE 2

1. In response to an indication that an initial space request for a first amount of space cannot be allocated on one of a plurality of volumes of direct access storage devices, allocating a first part of the initial space request on a first volume selected from the plurality of volumes;
2. If the initial space request has not been satisfied, allocating a second part of the initial space request on a second volume selected from the plurality of volumes;
3. Continuing to allocate space on the plurality of volumes until the initial space request has been satisfied;
4. If the initial space request cannot be satisfied, replacing a first extent limit on the number of extents that can be used to provide the space request with a second extent limit on the number of extents that can be used to provide the space request;
5. Reducing an initial space request by a preset amount to yield a revised space request;
6. Allocating a first part of the revised space request on a first volume selected from the plurality of volumes using the second extent limit;
7. If the revised space request has not been satisfied, allocating a second part of the revised space request on a second volume selected from the plurality of volumes; and
8. Continuing to allocate space on the plurality of volumes until the revised space request has been satisfied; or until a determination is made that the revised space request cannot be allocated on the plurality of volumes.

It should be noted that various steps in Example 2 can be eliminated or rearranged. For example, steps 4–8 could be eliminated. Alternatively, step 5 could be eliminated and the initial space request could be used with the second extent limit.

It should also be noted that in alternative embodiments, scenarios where data is spread over different volumes can be evaluated before an acceptable combination of volumes is selected. For example, in block 82 of FIG. 3, instead of proceeding to block 84 when an acceptable data spread is identified, the address of the acceptable volumes can be stored and some or all of the remaining "N" volumes can be evaluated with the addresses of each acceptable combination of volumes being stored. Then, all of the acceptable combination of volumes can be evaluated according to some predetermined criteria before one of the acceptable combination of volumes is selected for accommodating the space request.

It should be appreciated that the processes illustrated in Examples 1 and 2 and in FIGS. 2 and 3, represent functions that are implemented in software that runs on the computer system 10. There are many ways to write computer code that will allow these functions to be implemented as is known by those skilled in the art. The novelty of the present invention lies in the process for reducing space allocation errors illustrated in the examples, figures and accompanying text.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for reducing space allocation errors in a direct access storage device system comprising:

in response to an indication that an initial space request for a first amount of space cannot be allocated, changing a preset limit on the number of extents that can be used to provide the initial space request on a first volume of a direct access storage device to yield a revised limit on the number of extents;

in conjunction with changing the preset limit on the number of extents, reducing the initial space request by a predetermined percentage to yield a reduced space request; and attempting to allocate the reduced space request on the first volume using the revised limit on the number of extents.

2. The method of claim 1 wherein the revised limit is the maximum number of extents permitted by a data set.

3. The method of claim 1 further comprising:

before changing the preset limit on the number of extents, determining whether the user has authorized the change in the preset limit on the number of extents.

4. The method of claim 1 further comprising:

if the reduced space request cannot be allocated on the first volume using the revised limit, selecting a second volume in the direct access storage device; and attempting to allocate the reduced space request on the second volume of the direct access storage device using the revised limit.

5. A direct access storage device system for reducing space allocation errors comprising:

a computer;

a plurality of direct access storage devices;

first software means running on the computer for, in response to an indication that an initial space request for a first amount of space cannot be allocated on a single volume of the plurality of direct access storage devices, changing a preset limit on the number of extents that can be used to provide the first amount of space to yield a revised limit on the number of extents that can be used to provide an amount of space;

second software means running on the computer for reducing the initial space request by a preset percentage to yield a revised space request; and third software means running on the computer for attempting to allocate the revised space request on the first volume of the direct access storage device using the revised limit on the number of extents.

* * * * *